(12) United States Patent
Zhou et al.

(10) Patent No.: US 11,270,126 B2
(45) Date of Patent: Mar. 8, 2022

(54) PERSON TRACKING METHOD, DEVICE, ELECTRONIC DEVICE, AND COMPUTER READABLE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Peiming Zhou, Beijing (CN); Yun Ye, Beijing (CN); Aixi Zhang, Beijing (CN); Junhui Wu, Beijing (CN); Yu Chen, Beijing (CN); Zhi Weng, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 9 days.

(21) Appl. No.: 16/757,412

(22) PCT Filed: Sep. 18, 2018

(86) PCT No.: PCT/CN2018/106140
§ 371 (c)(1),
(2) Date: Apr. 19, 2020

(87) PCT Pub. No.: WO2019/080668
PCT Pub. Date: May 2, 2019

(65) Prior Publication Data
US 2020/0334466 A1 Oct. 22, 2020

(30) Foreign Application Priority Data

Oct. 23, 2017 (CN) .......................... 201710996063.0

(51) Int. Cl.
*G06K 9/00* (2022.01)
*G06T 7/207* (2017.01)
(Continued)

(52) U.S. Cl.
CPC ..... *G06K 9/00744* (2013.01); *G06K 9/00362* (2013.01); *G06N 3/08* (2013.01);
(Continued)

(58) Field of Classification Search
CPC combination set(s) only.
See application file for complete search history.

(56) References Cited

U.S. PATENT DOCUMENTS

| 5,813,863 | A | 9/1998 | Sloane et al. |
| 6,954,678 | B1 | 10/2005 | Phan et al. |

(Continued)

FOREIGN PATENT DOCUMENTS

| CN | 102436662 A | 5/2012 |
| CN | 103324937 A | 9/2013 |

(Continued)

OTHER PUBLICATIONS

The CN1OA dated May 7, 2020 by the CNIPA.
(Continued)

*Primary Examiner* — Zhiyu Lu
(74) *Attorney, Agent, or Firm* — Qinghong Xu (57) ABSTRACT

A person tracking method, comprising: acquiring N frames in units of time windows; acquiring, in time windows, tracking paths of a target person according to the N frames; and constructing continuous tracking paths by means of continuous time windows, so as to obtain the tracking results of the target person.

14 Claims, 9 Drawing Sheets

(51) Int. Cl.
*G06T 7/215* (2017.01)
*G06T 7/231* (2017.01)
*G06T 7/73* (2017.01)
*G06N 3/08* (2006.01)
*G06N 5/00* (2006.01)

(52) U.S. Cl.
CPC ............ *G06N 5/003* (2013.01); *G06T 7/207* (2017.01); *G06T 7/215* (2017.01); *G06T 7/231* (2017.01); *G06T 7/74* (2017.01); *G06K 2209/21* (2013.01); *G06T 2207/10016* (2013.01); *G06T 2207/30196* (2013.01); *G06T 2207/30241* (2013.01)

(56) References Cited

U.S. PATENT DOCUMENTS

| | | | |
|---|---|---|---|
| 8,643,778 B1* | 2/2014 | Singh | .................... G11B 27/005 348/452 |
| 2015/0081258 A1 | 3/2015 | Calderon et al. | |
| 2016/0005435 A1* | 1/2016 | Campbell | .......... G11B 27/3081 386/240 |
| 2017/0177947 A1* | 6/2017 | Citerin | .................... G06T 7/292 |

FOREIGN PATENT DOCUMENTS

| | | |
|---|---|---|
| CN | 104200488 A | 12/2014 |
| CN | 104484571 A | 4/2015 |
| CN | 104881882 A | 9/2015 |
| CN | 105205500 A | 12/2015 |
| CN | 105354588 A | 2/2016 |
| CN | 105577773 A | 5/2016 |
| CN | 106527496 A | 3/2017 |
| CN | 106846355 A | 6/2017 |
| CN | 106846361 A | 6/2017 |
| CN | 107203756 A | 9/2017 |
| TR | 201600871 A | 11/2016 |

OTHER PUBLICATIONS

The ISR dated Nov. 22, 2018 by the WIPO.
The Notice of Allowance dated Sep. 1, 2021 for CN patent application No. 201710996063.0.

* cited by examiner

PERSON TRACKING METHOD, DEVICE, ELECTRONIC DEVICE, AND COMPUTER READABLE MEDIUM

CROSS REFERENCE TO RELATED APPLICATIONS

The present application is based upon PCT application No. PCT/CN2018/106140, filed on Sep. 18, 2018, which claims the priority of Chinese Patent Application No. 201710996063.0, titled "PERSON TRACKING METHOD, DEVICE, ELECTRONIC DEVICE, AND COMPUTER READABLE MEDIUM", filed on Oct. 23, 2017. The entire content of this Chinese patent application is incorporated herein by reference.

TECHNICAL FIELD

The present disclosure relates generally to the technical field of video processing, and in particular, to a person tracking method, a device, an electronic device, and a computer readable medium.

BACKGROUND

Person tracking technology is widely used in video surveillance, and it is mostly implemented by the approach of "detection+association", that is, persons are detected from each frame of the video, and then these person detection frames are associated with person identity to achieve the purpose of tracking person's trajectories.

The above-mentioned information disclosed in the Background section is only used to enhance the understanding of the background of the present disclosure, so it may include information that does not constitute the prior art known to those skilled in the art.

SUMMARY

The present disclosure provides a person tracking method, a device, an electronic device, and a computer readable medium.

Other features and advantages of the disclosure will become apparent from the following detailed description, or may be learned in part through the practice of the disclosure.

According to an aspect of the present disclosure, a person tracking method is provided, including:

acquiring N frames in units of time windows;

acquiring, in the time windows, tracking paths of a target person according to the N frames;

constructing continuous tracking paths by continuous time windows, to obtain the tracking results of the target person.

In an embodiment of the present disclosure, a value of N is related to response delay.

In an embodiment of the present disclosure, the value of N is related to the response delay and a number of frames per second, and N=Ts*Ns, where Ts is the response delay and Ns is the number of frames per second.

In an embodiment of the present disclosure, the acquiring, in the time windows, the tracking paths of the target person according to the N frames includes:

performing person association matching, by using a global tracking algorithm, according to the N frames, to obtain the tracking paths of one or more of the target persons.

In an embodiment of the present disclosure, the performing the person association matching, by using the global tracking algorithm, according to the N frames includes:

acquiring, according to the N frames, one root node and a plurality of sub-nodes;

constructing, according to the root node and the plurality of sub-nodes, a multi-branch decision tree of a target person in a chronological order;

adding virtual sub-nodes into the multi-branch decision tree, the virtual sub-nodes being configured to simulate a frame of the target person that is not displayed in the time windows;

calculating person association score in the multi-branch decision tree;

performing the person association matching according to the person association score.

In an embodiment of the present disclosure, the calculating the person association score in the multi-branch decision tree includes:

extracting features by using a person convolutional neural network;

calculating the person association score according to a Euclidean distance between the features.

In an embodiment of the present disclosure, the continuous time windows include n time windows, and the constructing continuous tracking paths by means of continuous time windows includes:

calculating the tracking paths of the target person of an (n−1)th time window at an nth time window;

constructing the continuous tracking paths by means of person association matching between the continuous time windows by using a real-time tracking algorithm.

According to still another aspect of the present disclosure, a person tracking device is provided, including:

a frame acquiring module, configured to acquire N frames in units of time windows;

an in-time-windows tracking module, configured to acquire, in the time windows, tracking paths of a target person according to the N frames;

a continuous tracking paths module, configured to construct continuous tracking paths by means of continuous time windows, to obtain tracking results of the target person.

According to yet another aspect of the present disclosure, an electronic device is provided, including a processor; a memory storing instructions for the processor to control the operations as described above.

According to another aspect of the present disclosure, a computer readable medium is provided, on which computer-executable instructions are stored, and the computer-executable instructions implement the person tracking method as described above when executed by a processor.

It should be understood that the above general description and the following detailed description are merely exemplary, and should not limit the present disclosure.

BRIEF DESCRIPTION OF THE DRAWINGS

The above and other objects, features, and advantages of the present disclosure will become more apparent by describing its example embodiments in detail with reference to the accompanying drawings.

DETAILED DESCRIPTION

Example embodiments will now be described more fully with reference to the accompanying drawings. However, the example embodiments can be implemented in various forms and should not be construed as limited to the examples set forth herein; rather, the embodiments are provided so that this disclosure will be more comprehensive and complete, and the concepts of the example embodiments will be fully conveyed to those skilled in the art. The drawings are merely schematic illustrations of the present disclosure and are not necessarily drawn to scale. The same reference numerals in the drawings represent the same or similar parts, and thus repeated descriptions thereof will be omitted.

Furthermore, the described features, structures, or characteristics may be combined in any suitable manner in one or more embodiments. In the following description, numerous specific details are provided to give a thorough understanding of the embodiments of the present disclosure. However, those skilled in the art will realize that the technical solutions of the present disclosure may be practiced without omitting one or more of the specific details, or other methods, components, devices, steps, etc. may be adopted. In other instances, well-known structures, methods, devices, implementations, materials, or operations have not been shown or described in detail to avoid obscurity and obscure aspects of the present disclosure.

Some block diagrams shown in the drawings are functional entities and do not necessarily have to correspond to physically or logically independent entities. These functional entities may be implemented in the form of software, or implemented in one or more hardware modules or integrated circuits, or implemented in different networks and/or processor devices and/or microcontroller devices.

In order to make the objectives, technical solutions, and advantages of the present invention more clear, the present invention is further described in detail below with reference to specific embodiments and with reference to the accompanying drawings.

Person tracking technology can be classified into real-time processing and global processing, wherein the real-time processing refers to judging information of a next frame according to information of a previous frame, that is, judging person positions in the next frame according to historical tracking paths; the global processing refers to performing association according to information such as the person positions in all frames, after collecting an entire video and finally obtaining paths of the person's identity in the entire video.

The two solutions have their own advantages and disadvantages. Although the real-time processing solution can obtain tracking results in real time, it has poor processing ability in solving the occlusion, crossover between persons, and long-term disappearance of person, and when there is an error in determination of a certain frame, a frame after this certain frame cannot be corrected. Although the global processing solution can continuously correct errors of previous frames in processing, and has high fault tolerance, processing speed is very slow, so that tracking results cannot be obtained in real time.

Person tracking technology can be classified into location-based tracking, feature-based tracking, and location-and-feature-based tracking according to the information on which tracking is based. For example, a "multi-hypothesis tracking" (MHT) algorithm can be used based on the position and characteristics to construct a multi-branch decision tree structure for a person to achieve association matching between multiple frames and perform multi-object person tracking. However, the existing MHT algorithm has following main problems:

a. the algorithm cannot implement real-time processing, which limits its application scope, especially in the field of video perception processing;

b. although the algorithm has performed many elimination operations on the multi-branch decision tree to reduce amount of calculations, when the video length increases, it still faces the exponential increase of the amount of calculations and memory consumption;

c. after an occlusion occurs between the persons, the algorithm cannot accurately maintain an identity recognition function of the original person, that is, it cannot accurately associate a person before the occlusion with a person who reappears after the occlusion;

d. the algorithm uses a more complex scoring model when performing person association matching, and uses an online training classifier to perform the association, which results in higher computational complexity.

Based on the above, the existing MHT algorithm has the above defects. The present disclosure improves a person tracking method. For details, please refer to the following embodiments.

Figure 1:
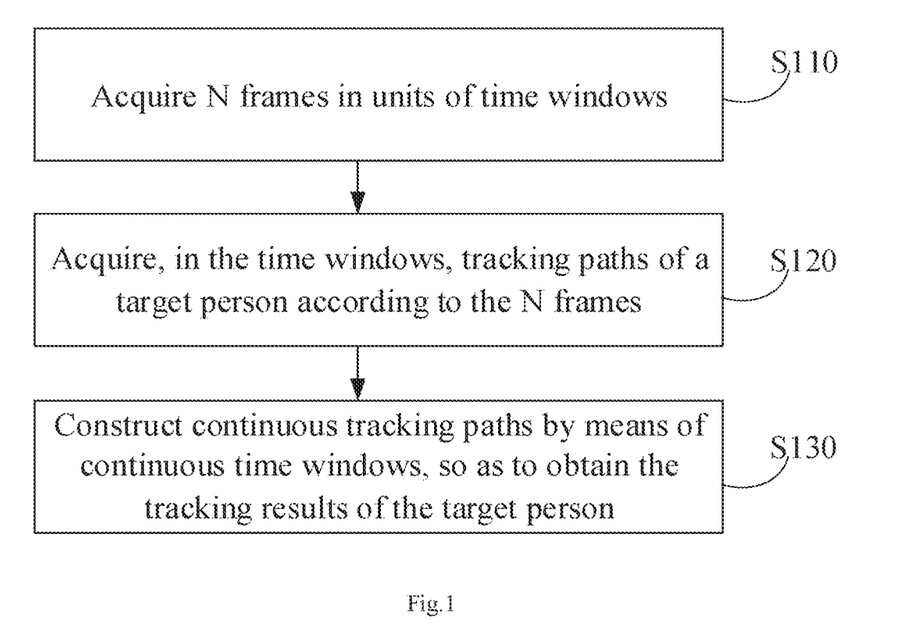
FIG. 1 illustrates a flowchart of a person tracking method provided in an embodiment of the present disclosure.

FIG. 1 illustrates a flowchart of a person tracking method provided in an embodiment of the present disclosure, including the following steps:

as shown in FIG. 1, in step S110, acquire N frames in units of time windows;

as shown in FIG. 1, in step S120, acquire, in time windows, tracking paths of a target person according to the N frames;

as shown in FIG. 1, in step S130, construct continuous tracking paths by means of continuous time windows, so as to obtain the tracking results of the target person.

Based on the existing MHT algorithm, the person tracking method provided by the present disclosure uses a global tracking solution in units of time windows to process a video containing N frames, so as to obtain tracking paths of a target person in frames, and a real-time tracking solution is used to perform processing between the time windows. This method optimizes tracking methods of global tracking and real-time tracking, and not only can implement quasi-real-time person tracking, but also can avoid a problem of exponential increase of the calculation and memory demand as the depth of the decision tree increases.

In some embodiments of the present disclosure, assuming that a length of a time window is N frames, the 0th to (N−1)th, Nth to (2N−1)th, 2Nth to (3N−1)th, . . . , (n−1) Nth~(nN−1)th are respectively divided into n time windows. First, in each of the time windows, a multi-frame global tracking algorithm is used, and the tracking paths in the N frames are given after the time windows end, wherein, the tracking path here can be the tracking paths of one target person or a plurality of target persons, which needs to be determined according to needs in a specific application scenario. Second, in this embodiment, a manner similar to real-time tracking may be used to perform person association matching between the time windows. Based on this, the tracking results of the (n−1)th time window can be given during the nth time window. Although this method will delay the tracking results by N frames, the effect of real-time processing can be achieved. Compared with the global tracking solution where tracking calculation of a person's path is performed after all frames of the video are obtained, in this embodiment, the global tracking algorithm is performed every time the N frames are acquired to obtain the tracking paths of the target person and obviously, the timeliness is greatly improved, so the tracking paths of the target person can be quasi-real-time obtained.

In step S110 in this embodiment, the N frames are divided into one time window, where a value of N is related to response delay. In a specific application scenario, the value of N can be related to the response delay and a number of frames per second, that is, N=Ts*Ns, where Ts is the response delay and Ns is the number of frames per second. For example, if the application scenario allows a response delay of 10 seconds, the value of N can be the number of frames in 10 seconds. Assuming that a video plays 24 frames per second, N=10*24=240.

It should also be noted that in addition to the response delay and the number of frames per second, the value of N in this embodiment may also be determined according to the requirements for algorithm performance and computing resources. In general, the larger the value of N, the better the algorithm's fault tolerance, that is, the better the effect of solving long-term occlusion problems; on the other hand, the smaller the value of N, the smaller the response delay and the lower the computing resource consumption. Therefore, in specific applications, it needs to be determined according to specific requirements such as the response delay, algorithm performance, and computing resources.

In step S120 of this embodiment, a global tracking algorithm is used according to the N frames to perform the person association matching to obtain the tracking paths of one or more of the target persons.

Figure 2:
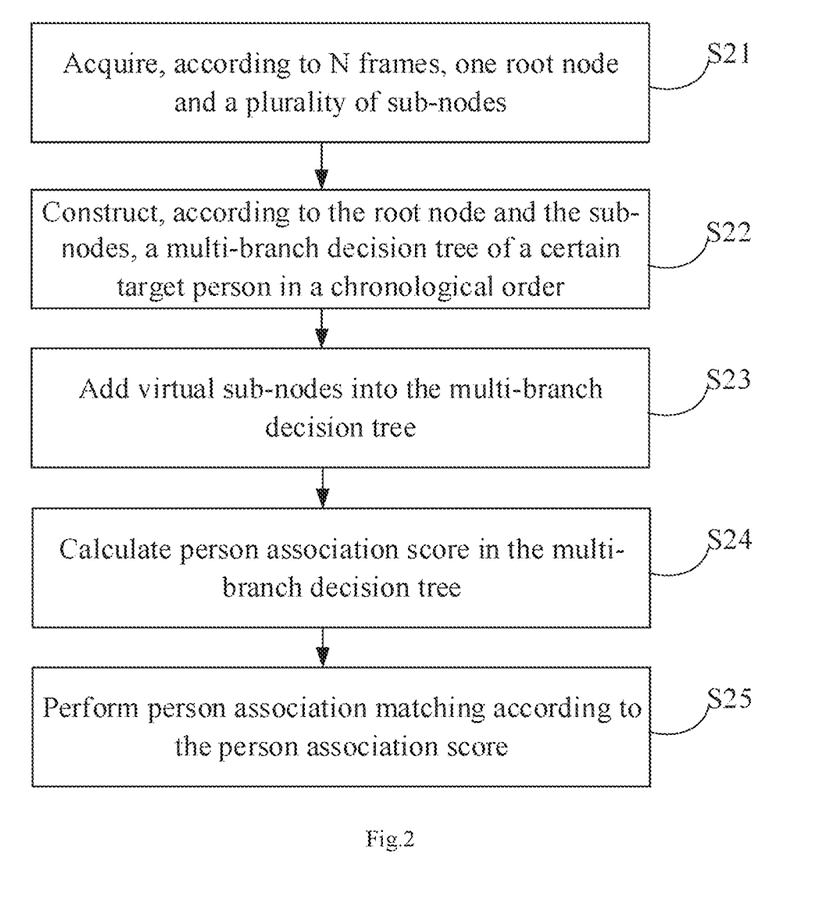
FIG. 2 illustrates a flowchart of step S120 in FIG. 1 according to an embodiment of the present disclosure.

FIG. 2 shows a flowchart of obtaining the tracking paths of one or more of the target persons using the global tracking algorithm based on the N frames in step S120 of this embodiment to perform the person association matching, and includes the following steps:

as shown in FIG. 2, in step S21, acquiring, according to the N frames, one root node and a plurality of sub-nodes;

as shown in FIG. 2, in step S22, constructing, according to the root node and the plurality of sub-nodes, a multi-branch decision tree of a target person in a chronological order;

as shown in FIG. 2, in step S23, adding virtual sub-nodes into the multi-branch decision tree, the virtual sub-nodes being configured to simulate a frame of the target person that is not displayed in the time windows;

as shown in FIG. 2, in step S24, calculating person association score in the multi-branch decision tree;

as shown in FIG. 2, in step S25, performing the person association matching according to the person association score.

Figure 3:
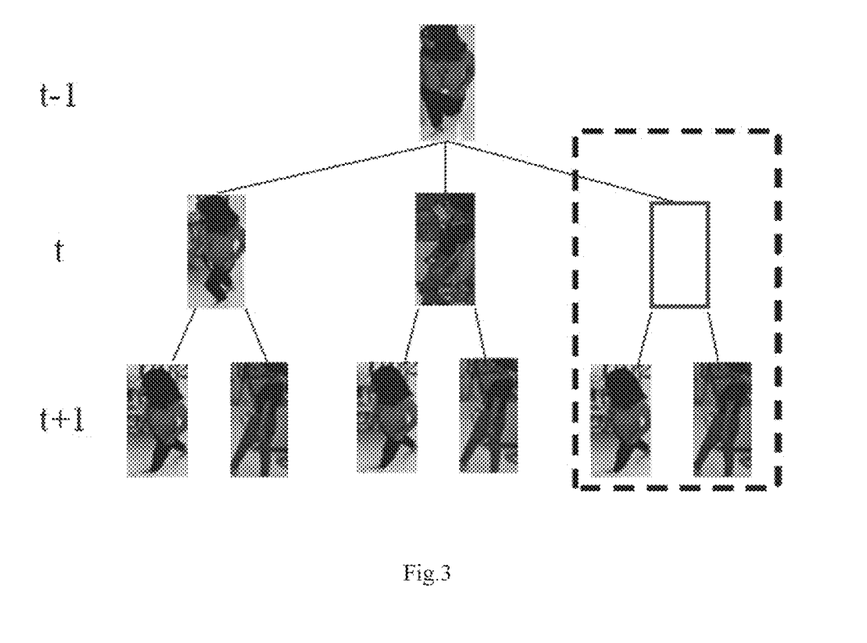
FIG. 3 is a schematic diagram of a multi-branch decision tree constructed in an embodiment of the present disclosure.

FIG. 3 shows a schematic diagram of a multi-branch decision tree constructed in this embodiment, wherein an image of a (t−1)th frame is a root node of the multi-branch decision tree, a t-th frame contains three sub-nodes and a (t+1)th frame contains six sub-nodes. As shown in FIG. 3, two images of the t-th frame are used as two sub-nodes, and based on this, a virtual sub-node is added; four images of the (t+1)th frame are used as four sub-nodes, and based on this, two virtual sub-nodes can be further simulated and obtained according to the virtual sub-node of the t-th frame, that is, images in dotted block are virtual sub-node.

The method provided by this embodiment introduces a virtual "missing" node into the multi-branch decision tree structure of the traditional MHT algorithm, and is used to simulate a situation in which the person is neglected, blocked, or missing at the t-th frame. The virtual sub-nodes in the multi-branch decision tree take part in the an optimization algorithm of the decision tree, as same as ordinary root nodes or sub-nodes. The decision tree is optimized based on the person association score, and what is different from ordinary sub-nodes is that a value of the person association score of the virtual sub-node should be set to a threshold that can distinguish person features, which is used to indicate that no detection block matching the root node (the (t−1)th frame) is found in the current image at the t-th frame. It is considered that the current frame (t-th frame) is missing, and an image that may appear in the t-th frame is obtained by speculation based on the image of the (t−1)th frame.

Figure 4:
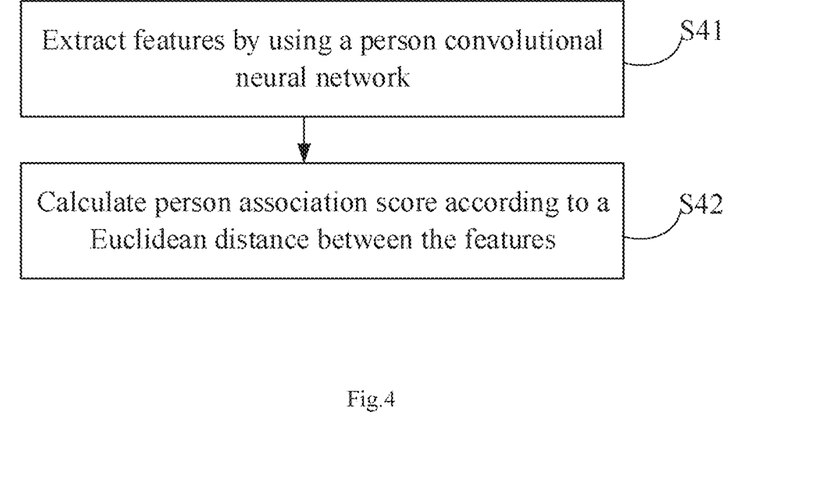
FIG. 4 illustrates a flowchart of step S24 in FIG. 2 according to an embodiment of the present disclosure.

In this embodiment, FIG. 4 shows a flowchart of calculating person association score in the multi-branch decision tree in step S24 in this embodiment, including the following steps.

As shown in FIG. 4, in step S41, extract features by using a person convolutional neural network. It should be noted that the features here is a high-dimensional vector. For example, information such as person posture, clothing, and position each belongs to one dimension in the features.

As shown in FIG. 4, in step S42, calculate the person association score
according to a Euclidean distance between the features. Generally, in a process of calculating the person association score, in addition to calculation based on calculation formula, a decision is also made based on an online training classifier. This calculation process has a high calculation complexity, resulting in long program execution time and memory consumption. In this embodiment, the score is calculated by simplifying the calculation process of the person association score and directly calculating the Euclidean distance between the features extracted by a person Convolutional Neural Network (CNN). If it is detected that the longer the Euclidean distance between the features of a target person in two frames before and after, the lower the similarity between the two frames, and the lower the person association score; on the contrary, if it is detected that the shorter the Euclidean distance between the features of the target person in the two frames before and after, the higher the similarity between the two, and the higher the person association score.

After obtaining the person association score, the person association matching is performed according to step S25, that is, when making a decision according to the multi-branch decision tree shown in FIG. 3, the person association score is used as the basis. A highest person association score is a better match, so best tracking paths for a certain target person can be obtained in the multi-branch decision tree. The solution provided by this embodiment can greatly save calculation time, thereby ensuring that real-time processing can be achieved.

In this embodiment, the continuous time windows in step S130 may include n time windows, that is, the time windows can be continuously obtained during video production process, and after one time window ends, the N frames in the time windows are globally processed to obtain the tracking paths in the time windows. Therefore, the tracking paths of the target person in the (n−1)th time window is calculated at the nth time window, and then a real-time tracking algorithm is used to construct continuous tracking paths by means of the person association matching between consecutive time windows. The person association matching here is same as method and principle of performing matching according to the person association score in step S25, and is not repeated here.

Figure 5:
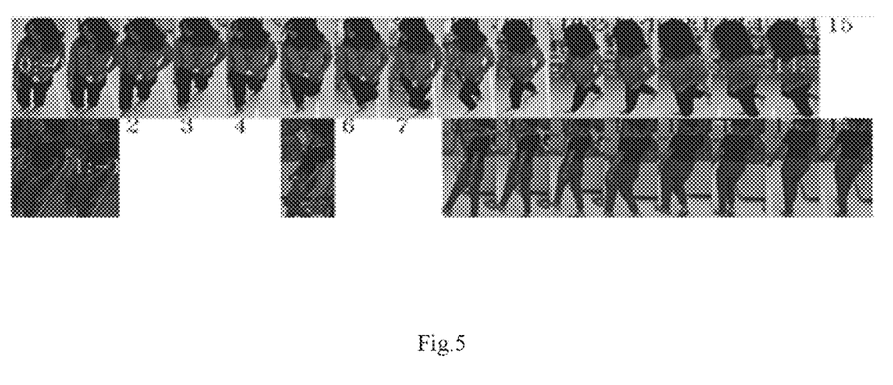
FIG. 5 illustrates a comparison diagram of performing person tracking using the method provided in this embodiment and performing person tracking using the method provided in the prior art in an embodiment of the present disclosure.

FIG. 5 shows a comparison diagram of person tracking using the method provided in this embodiment and person tracking using the method provided in the prior art, both taking a time window with a length of 16 frames as an example. First row is a result by using the method provided in this embodiment to perform the person tracking, and second row is a result by using the method provided in the prior art to perform the person tracking. As shown in FIG. 5, in the second row, the person in the 0~15th frame appear to be "missing" in a plurality of frames due to neglecting, occlusion, etc, for example, "missing" is found in each of the 2th, 3th, 4th, 6th, and 7th frame; in the first row, the tracking paths of the person in 0th to 15th frame is relatively continuous, and the tracking results are more complete. It can be seen that the method provided in this embodiment can effectively solve the "missing" phenomenon of person tracking, and build more complete and continuous tracking paths.

In summary, the person tracking method provided in this embodiment improves the current multiple hypothesis tracking (MHT) algorithm, introduces a concept of time windows, and performs global tracking in the time windows to obtain tracking paths of a target person. Under the premise of preserving the advantages of MHT multi-frame global matching, quasi-real-time person tracking can be realized, and the application range of the algorithm is expanded. It can be widely used in real-time video surveillance, video analysis, security and other aspects of public places.

Secondly, by improving a tree structure of MHT, a virtual "missing" node is introduced in the decision tree structure to simulate a target person being blocked, neglected, or leaving the image to solve the occlusion, missing, etc. problem.

Finally, the calculation of the person association score in the person association matching algorithm is simplified, and the Euclidean distance between the features of the convolutional neural network (CNN) between the persons is directly used as the person association score, so that the computing efficiency is significantly improved.

In short, this person tracking method combines the advantages of multiple tracking algorithms (global tracking and real-time tracking) to focus on improving the accuracy of tracking in complex scenarios (heavier occlusion or long-term disappearance between persons), and proposes a solution for real-time processing and low computing cost.

Figure 6:
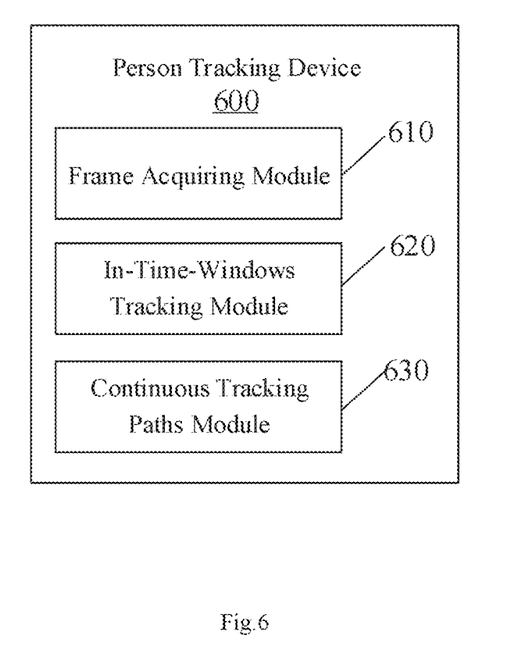
FIG. 6 is a schematic diagram of a person tracking device provided in another embodiment of the present disclosure.

FIG. 6 is a schematic diagram of a person tracking device provided in another embodiment of the present disclosure. As shown in FIG. 6, a person tracking device 600 includes a frame acquiring module 610, an in-time-windows tracking module 620, and a continuous tracking paths module 630.

The frame acquiring module is configured to acquire N frames in units of time windows; the in-time-windows tracking module is configured to acquire, in time windows, tracking paths of a target person according to the N frames; The continuous tracking paths module is configured to construct continuous tracking paths by means of continuous time windows, to obtain tracking results of the target person.

In the frame acquiring module 610, it is assumed that a length of a time window is N frames, 0~(N−1)th, Nth~(2N−1)th, 2Nth~(3N−1)th, . . . , (n−1)Nth~(nN−1)th are divided into n time windows. First, in each of the time windows, a multi-frame global tracking algorithm is used, and the tracking paths in the N frames are given after the time window ends. The tracking paths here can be the tracking paths of a target person or a plurality of target persons, which needs to be determined according to the needs in a specific application scenario. Secondly, in this embodiment, a manner similar to real-time tracking may be used to perform person association matching between the time windows. Based on this, the tracking results of the (n−1)th time window can be given during the nth time window. Although this method will delay the tracking results by N frames, the effect of real-time processing can be achieved. Compared with the global tracking solution where it is necessary to obtain all frames of the video before performing tracking calculation of a person's path, in this embodiment, the global tracking algorithm is performed every time the N frames are acquired to obtain the tracking paths of the target person and obviously, the timeliness is greatly improved, so the tracking paths of the target person can be quasi-real-time obtained.

In the frame acquiring module 610, the N frames are divided into one time window, where a value of N is related to response delay. In a specific application scenario, the value of N can be related to the response delay and a number of frames per second, that is, N=Ts*Ns, where Ts is the response delay and Ns is the number of frames per second. For example, if the application scenario allows a response delay of 10 seconds, the value of N can be the number of frames in 10 seconds, Assuming that a video plays 24 frames per second, N=10*24=240.

It should also be noted that in addition to the response delay and the number of frames per second, the value of N in this embodiment may also be determined according to the requirements for algorithm performance and computing resources. In general, the larger the value of N, the better the algorithm's fault tolerance, that is, the better the effect of solving long-term occlusion problems; on the other hand, the smaller the value of N, the smaller the response delay and the lower the computing resource consumption. Therefore, in specific applications, it needs to be determined according to specific requirements such as the response delay, algorithm performance, and computing resources.

In the in-time-windows tracking module 620, a global tracking algorithm is used according to the N frames to perform the person association matching to obtain the tracking paths of one or more of the target persons.

Figure 7:
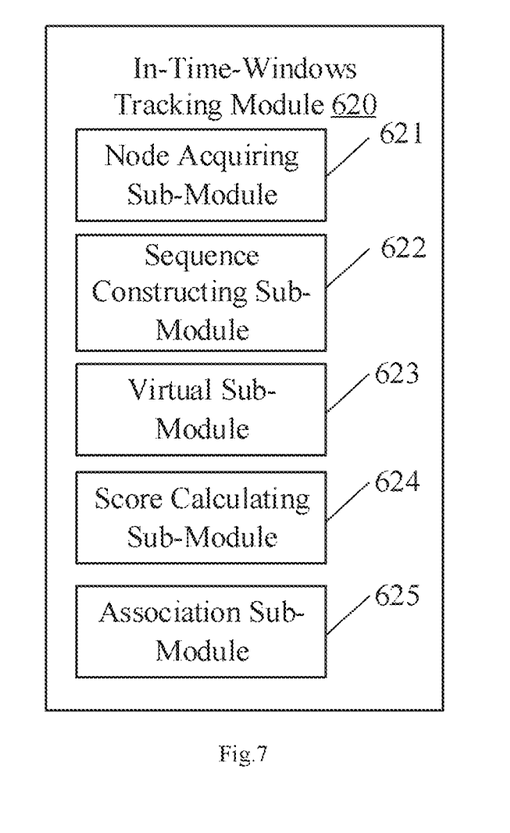
FIG. 7 is a schematic diagram of a tracking module 620 in time windows in FIG. 6 according to an embodiment of the present disclosure.

FIG. 7 shows a schematic diagram of the in-time-windows tracking module 620 in FIG. 6 in this embodiment. As shown in FIG. 7, the in-time-windows tracking module 620 includes a node acquiring sub-module 621, a sequence constructing sub-module 622, a virtual sub-module 623, a score calculating sub-module 624, and an association sub-module 625.

The node acquiring sub-module 621 is configured to acquire a root node and a plurality of sub-nodes according to the N frames. The sequence constructing sub-module 622 is configured to construct a multi-branch decision tree of a certain target person in chronological order according to the root node and the sub-nodes. The virtual sub-module 623 is configured to add a virtual sub-node to the multi-branch decision tree, and the virtual sub-node is used to simulate a frame of the target person that is not displayed in the time windows. The score calculating score sub-module 624 is configured to calculate person association score in a multi-branch decision tree. The association sub-module 625 is configured to perform person association matching according to the person association score.

Figure 8:
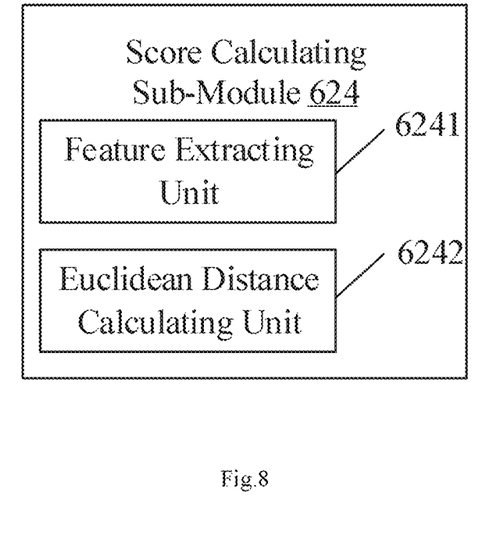
FIG. 8 is a schematic diagram of a score calculating sub-module 624 calculated in FIG. 7 according to another embodiment of the present disclosure.

FIG. 8 shows a schematic diagram of the score calculating score sub-module 624 in FIG. 7 in this embodiment. As shown in FIG. 8, the score calculating score sub-module 624 includes a feature extracting unit 6241 and a Euclidean distance calculating unit 6242. The feature extracting unit 6241 is configured to use a person convolutional neural network (CNN) to extract features; the Euclidean distance calculating unit 6242 is configured to calculate the person association score based on the Euclidean distance between the features. Generally, in a process of calculating the person association score, in addition to calculation based on calculation formula, a decision is also made based on an online training classifier. This calculation process has a high calculation complexity, resulting in long program execution time and memory consumption. In this embodiment, the score is calculated by simplifying the calculation process of the person association score and directly calculating the Euclidean distance between the features extracted by a person Convolutional Neural Network (CNN). If it is detected that the longer the Euclidean distance between the features of a target person in two frames before and after, the lower the similarity between the two frames, and the lower the person association score; on the contrary, if it is detected that the shorter the Euclidean distance between the features of the target person in the two frames before and after, the higher the similarity between the two, and the higher the person association score.

For functions of each module in the device, refer to the related description in the foregoing method embodiments, and details are not described herein again.

In summary, the person tracking method provided in this embodiment improves the current multiple hypothesis tracking (MHT) algorithm, introduces a concept of time windows, and performs global tracking in the time windows to obtain tracking paths of a target person. Under the premise of preserving the advantages of MHT multi-frame global matching, quasi-real-time person tracking can be realized, and the application range of the algorithm is expanded. It can be widely used in real-time video surveillance, video analysis, security and other aspects of public places.

Secondly, by improving a tree structure of MHT, a virtual "missing" node is introduced in the decision tree structure to simulate a target person being blocked, neglected, or leaving the image to solve the occlusion, missing, etc. problem.

Finally, the calculation of the person association score in the person association matching algorithm is simplified, and the Euclidean distance between the features of the convolutional neural network (CNN) between the persons is directly used as the person association score, so that the computing efficiency is significantly improved.

In short, this person tracking method combines the advantages of multiple tracking algorithms (global tracking and real-time tracking) to focus on improving the accuracy of tracking in complex scenarios (heavier occlusion or long-term disappearance between persons), and proposes a solution for real-time processing and low computing cost.

In another aspect, the present disclosure also provides an electronic device including a processor and a memory, and the memory stores instructions for the processor to control the following operations:

acquire N frames in units of time windows; acquire, in time windows, tracking paths of a target person according to the N frames; and construct continuous tracking paths by means of continuous time windows, so as to obtain the tracking results of the target person.

Figure 9:
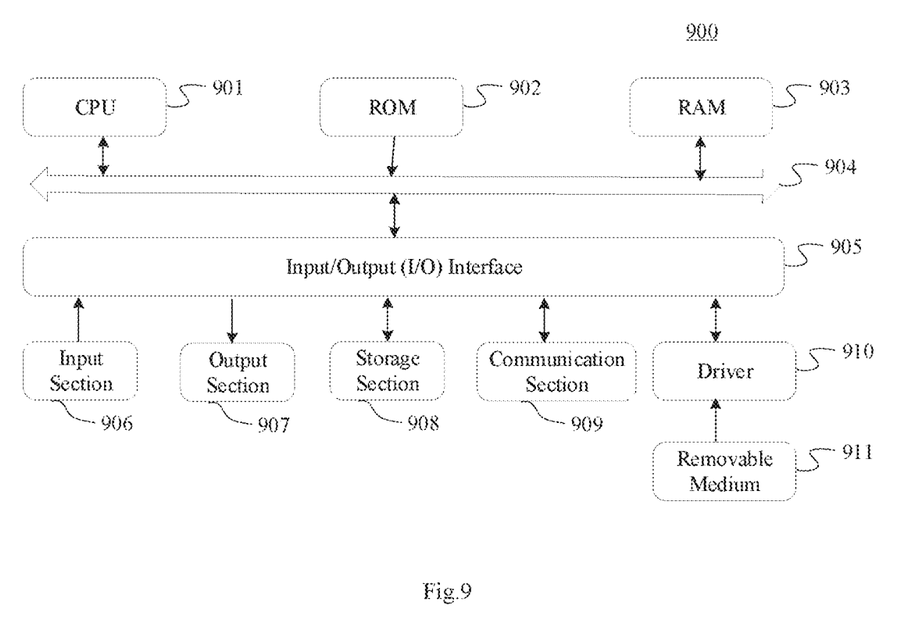
FIG. 9 is a schematic structural diagram of a computer system suitable for implementing an electronic device according to an embodiment of the present disclosure.

Reference is now made to FIG. 9, which is a schematic structural diagram of a computer system 900 suitable for implementing an electronic device according to an embodiment of the present application. The electronic device shown in FIG. 9 is only an example, and should not impose any limitation on the functions and scope of use of the embodiments of the present application.

As shown in FIG. 9, the computer system 900 includes a central processing unit (CPU) 901, which can perform various appropriate actions and processes in accordance with a program stored in a read-only memory (ROM) 902 or a program loaded from a storage section 907 into a random access memory (RAM) 903. In the RAM 903, various programs and data required for the operation of the system 900 are also stored. The CPU 901, the ROM 902, and the RAM 903 are connected to each other through a bus 904. An input/output (I/O) interface 905 is also connected to the bus 904.

Following components are connected to the I/O interface 905: an input section 906 including a keyboard, a mouse, and the like; an output section 907 including a cathode ray tube (CRT), a liquid crystal display (LCD), a speaker and the like; a storage section 908 including a hard disk and the like, and a communication section 909 including a network interface card such as a LAN card, a modem, and the like. The communication section 909 performs communication processing via a network such as the Internet. A driver 910 is also connected to the I/O interface 905 as needed. A removable medium 911, such as a magnetic disk, an optical disk, a magneto-optical disk, a semiconductor memory, etc., is installed on the drive 910 as needed, so that a computer program read therefrom is installed into the storage section 908 as needed.

In particular, according to an embodiment of the present disclosure, the process described above with reference to the flowchart may be implemented as a computer software program. For example, embodiments of the present disclosure include a computer program product including a computer program carried on a computer readable medium, the computer program containing program code for performing a method shown in a flowchart. In such an embodiment, the computer program may be downloaded and installed from a network through the communication section 909, and/or installed from the removable medium 911. When this computer program is executed by a central processing unit (CPU) 901, the above-mentioned functions defined in the system of the present application are executed.

It should be noted that the computer readable medium shown in this application may be a computer readable signal medium or a computer readable medium or any combination of the foregoing. The computer readable medium may be, for example, but not limited to, an electronic, magnetic, optical, electromagnetic, infrared, or semiconductor system, apparatus, or device, or any combination thereof. More specific examples of computer readable media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing. In this application, a computer readable medium may be any tangible medium that contains or stores a program that can be used by or in combination with an instruction execution system, apparatus, or device. In this application, a computer readable signal medium may include a data. signal that is included in baseband or propagated as part of a carrier wave, and which carries computer readable program code. Such a propagated data signal may take many forms, including but not limited to electromagnetic signals, optical signals, or any suitable combination of the foregoing. The computer readable signal medium can also be any computer readable medium other than a computer readable medium, which can send, propagate, or transmit a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The flowchart and block diagrams in the accompanying drawings illustrate the architecture, functionality, and operation of possible implementations of systems, methods and computer program products according to various embodiments of the present application. In this regard, each block in the flowchart or block diagram may represent a module, a program segment, or a part of code, which contains one or more of executable instructions used to implement specified logic functions. It should also be noted that in some alternative implementations, the functions noted in the blocks may also occur in a different order than those marked in the drawings. For example, two successively represented blocks may actually be executed substantially in parallel, and they may sometimes be executed in the reverse order, depending on the functions involved. It should also be noted that each block in the block diagram or flowchart, and combinations of blocks in the block diagram or flowchart, can be implemented by a dedicated hardware-based system that performs the specified function or operation, or by a combination of dedicated hardware and computer instructions.

The units described in the embodiments of the present application may be implemented by software or hardware. The described unit may also be provided in a processor, for example, it may be described as: a processor includes a sending unit, an obtaining unit, a determining unit, and a first processing unit, wherein, the names of these units do not constitute a limitation on the unit itself in some cases. For example, the sending unit can also be described as a "unit that sends a frame acquiring request to a connected server".

On the other hand, the present disclosure also provides a computer readable medium, which may be included in the device described in the above embodiments; or may exist alone without being assembled into the device. The computer readable medium carries one or more programs. When the one or more programs are executed by one device, the device includes:

acquiring N frames in units of time windows; acquiring, in time windows, tracking paths of a target person according to the N frames; and constructing continuous tracking paths by means of continuous time windows, so as to obtain the tracking results of the target person.

According to the person tracking method, device, electronic device and computer readable medium provided by the embodiments of the present disclosure, based on existing MHT algorithm, a video containing N frames is processed using a global tracking solution in units of time windows, so as to obtain tracking paths of a target person in frames, and a real-time tracking solution is used to perform processing between the time windows. This method optimizes tracking methods of global tracking and real-time tracking, and not only can implement quasi-real-time person tracking, but also can avoid a problem of exponential increase of the calculation and memory demand as the depth of the decision tree increases.

It should be clearly understood that the present disclosure describes how to make and use specific examples, but the principles of the present disclosure are not limited to any details of these examples. Rather, these principles can be applied to many other embodiments based on the teachings of this disclosure.

The exemplary embodiments of the present disclosure have been particularly shown and described above. It should be understood that the present disclosure is not limited to the detailed structure, arrangement, or implementation method described herein; rather, the present disclosure is intended to cover various modifications and equivalent arrangements included within the spirit and scope of the appended claims.

What is claimed is:

1. A person tracking method, comprising:
   acquiring, by a processor, N frames in units of time windows;
   acquiring, by the processor in the time windows, tracking paths of a target person according to the N frames;
   constructing, by the processor, continuous tracking paths by continuous time windows, to obtain the tracking results of the target person,
   wherein, the acquiring, in the time windows, the tracking paths of the target person according to the N frames comprises:
   performing person association matching, by using a global tracking algorithm, according to the N frames, to obtain the tracking paths of one or more of the target persons,
   wherein, the performing the person association matching, by using the global tracking algorithm, according to the N frames comprises:
   acquiring, according to the N frames, one root node and a plurality of sub-nodes;
   constructing, according to the root node and the plurality of sub-nodes, a multi-branch decision tree of a target person in a chronological order;
   adding virtual sub-nodes into the multi-branch decision tree, the virtual sub-nodes being configured to simulate a frame of the target person that is not displayed in the time windows;
   calculating person association score in the multi-branch decision tree;
   performing the person association matching according to the person association score.

2. The person tracking method according to claim 1, wherein, a value of N is related to response delay.

3. The person tracking method according to claim 2, wherein, the value of N is related to the response delay and a number of frames in each second, and N=Ts*Ns, where Ts is the response delay and Ns is the number of frames in each second.

4. The person tracking method according to claim 1, wherein, the calculating the person association score in the multi-branch decision tree comprises:
   extracting features by using a person convolutional neural network;

calculating the person association score according to a Euclidean distance between the features.

5. The person tracking method according to claim 1, wherein, the continuous time windows comprise n time windows, and the constructing continuous tracking paths by means of continuous time windows comprises:
calculating the tracking paths of the target person of an (n−1)th time window at an nth time window;
constructing the continuous tracking paths by means of person association matching between the continuous time windows by using a real-time tracking algorithm.

6. An electronic device, comprising:
a processor;
a memory, storing instructions for the processor to:
acquire N frames in units of time windows;
acquire, in the time windows, tracking paths of a target person according to the N frames;
construct continuous tracking paths by continuous time windows, to obtain the tracking results of the target person,
wherein, the processor is caused to:
perform person association matching, by using a global tracking algorithm, according to the N frames, to obtain the tracking paths of one or more of the target persons, and
wherein, the processor is caused to:
acquire, according to the N frames, one root node and a plurality of sub-nodes;
construct, according to the root node and the plurality of sub-nodes, a multi-branch decision tree of a target person in a chronological order;
add virtual sub-nodes into the multi-branch decision tree, the virtual sub-nodes being configured to simulate a frame of the target person that is not displayed in the time windows;
calculate person association score in the multi-branch decision tree;
perform the person association matching according to the person association score.

7. The electronic device according to claim 6, wherein, a value of N is related to response delay.

8. The electronic device according to claim 7, wherein, the value of N is related to the response delay and a number of frames in each second, and N=Ts*Ns, where Ts is the response delay and Ns is the number of frames in each second.

9. The electronic device according to claim 6, wherein, the processor is caused to:
extract features by using a person convolutional neural network;
calculate the person association score according to a Euclidean distance between the features.

10. The electronic device according to claim 6, wherein, the continuous time windows comprise n time windows, and the processor is caused to:
calculate the tracking paths of the target person of an (n−1)th time window at an nth time window;
construct the continuous tracking paths by means of person association matching between the continuous time windows by using a real-time tracking algorithm.

11. A non-transitory computer readable medium, on which computer-executable instructions are stored, wherein, when executed by a processor, the computer-executable instructions implement a person tracking method comprising:
acquiring N frames in units of time windows; acquiring, in the time windows, tracking paths of a target person according to the N frames; constructing continuous tracking paths by continuous time windows, to obtain the tracking results of the target person wherein, the acquiring, in the time windows, the tracking paths of the target person according to the N frames comprises: performing person association matching, by using a global tracking algorithm, according to the N frames, to obtain the tracking paths of one or more of the target persons, and wherein, the performing the person association matching, by using the global tracking algorithm, according to the N frames comprises: acquiring, according to the N frames, one root node and a plurality of sub-nodes; constructing, according to the root node and the plurality of sub-nodes, a multi-branch decision tree of a target person in a chronological order; adding virtual sub-nodes into the multi-branch decision tree, the virtual sub-nodes being configured to simulate a frame of the target person that is not displayed in the time windows; calculating person association score in the multi-branch decision tree; performing the person association matching according to the person association score.

12. The non-transitory computer readable medium according to claim 11, wherein, a value of N is related to response delay.

13. The non-transitory computer readable medium according to claim 12, wherein, the value of N is related to the response delay and a number of frames in each second, and N=Ts*Ns, where Ts is the response delay and Ns is the number of frames in each second.

14. The non-transitory computer readable medium according to claim 11, wherein, the calculating the person association score in the multi-branch decision tree comprises: extracting features by using a person convolutional neural network; calculating the person association score according to a Euclidean distance between the features.

* * * * *